(12) United States Patent
Busaba et al.

(10) Patent No.: US 10,521,262 B2
(45) Date of Patent: *Dec. 31, 2019

(54) MEMORY ACCESS REQUEST FOR A MEMORY PROTOCOL

(71) Applicant: International Business Machines Corporation, Armonk, NY (US)

(72) Inventors: Fadi Y. Busaba, Poughkeepsie, NY (US); Harold W. Cain, III, Raleigh, NC (US); Michael Karl Gschwind, Chappaqua, NY (US); Valentina Salapura, Chappaqua, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 399 days.

This patent is subject to a terminal disclaimer.

(21) Appl. No.: 15/265,253

(22) Filed: Sep. 14, 2016

(65) Prior Publication Data

US 2017/0090978 A1 Mar. 30, 2017

Related U.S. Application Data

(63) Continuation of application No. 15/160,074, filed on May 20, 2016, now Pat. No. 9,535,608, which is a
(Continued)

(51) Int. Cl.
*G06F 9/46* (2006.01)
*G06F 13/16* (2006.01)
(Continued)

(52) U.S. Cl.
CPC .............. *G06F 9/467* (2013.01); *G06F 3/061* (2013.01); *G06F 3/0605* (2013.01);
(Continued)

(58) Field of Classification Search
None
See application file for complete search history.

(56) References Cited

U.S. PATENT DOCUMENTS 6,625,685 B1 9/2003 Cho et al.
6,711,668 B1 3/2004 Wojcieszak et al.
(Continued)

OTHER PUBLICATIONS

IBM, "List of IBM Patents or Patent Applications Treated as Related", Appendix P, 2 pages, dated Sep. 17, 2016.
(Continued)

*Primary Examiner* — Shih-Wei Kraft
(74) *Attorney, Agent, or Firm* — Robert J. Shatto

(57) ABSTRACT

A computer-implemented method includes identifying two or more memory locations and referencing, by a memory access request, the two or more memory locations. The memory access request is a single action pursuant to a memory protocol. The computer-implemented method further includes sending the memory access request from one or more processors to a node and fetching, by the node, data content from each of the two or more memory locations. The computer-implemented method further includes packaging, by the node, the data content from each of the two or more memory locations into a memory package, and returning the memory package from the node to the one or more processors. A corresponding computer program product and computer system are also disclosed.

6 Claims, 6 Drawing Sheets

Related U.S. Application Data continuation of application No. 14/867,148, filed on Sep. 28, 2015, now Pat. No. 9,507,628.

(51) Int. Cl.

| | | |
|---|---|---|
| *G06F 13/42* | (2006.01) | |
| *G06F 3/06* | (2006.01) | |
| *G06F 12/0811* | (2016.01) | |
| *G06F 12/0817* | (2016.01) | |
| *G06F 12/0862* | (2016.01) | |

(52) U.S. Cl.
CPC .......... *G06F 3/0659* (2013.01); *G06F 3/0673* (2013.01); *G06F 12/0811* (2013.01); *G06F 12/0828* (2013.01); *G06F 12/0862* (2013.01); *G06F 13/16* (2013.01); *G06F 13/42* (2013.01); *G06F 2212/283* (2013.01); *G06F 2212/602* (2013.01); *G06F 2212/621* (2013.01)

(56) References Cited

U.S. PATENT DOCUMENTS

| 6,829,680 | B1 | 12/2004 | Sugumar et al. | |
|---|---|---|---|---|
| 6,895,496 | B1 | 5/2005 | Taniguchi et al. | |
| 7,162,588 | B2 | 1/2007 | van de Waerdt | |
| 2003/0135698 | A1* | 7/2003 | Berg | G11C 7/1006 711/147 |
| 2004/0153607 | A1 | 8/2004 | Rowlands et al. | |
| 2004/0162954 | A1* | 8/2004 | Chauvel | G06F 9/541 711/155 |
| 2008/0244354 | A1 | 10/2008 | Wu et al. | |
| 2009/0019262 | A1* | 1/2009 | Tashiro | G06F 9/3016 712/208 |
| 2010/0125444 | A1 | 5/2010 | Arya et al. | |
| 2010/0169382 | A1* | 7/2010 | Sheaffer | G06F 12/0842 707/802 |
| 2010/0180081 | A1 | 7/2010 | Bose et al. | |
| 2010/0241807 | A1 | 9/2010 | Wu et al. | |
| 2011/0238775 | A1 | 9/2011 | Wu et al. | |
| 2012/0210162 | A1 | 8/2012 | Gara et al. | |
| 2012/0233413 | A1 | 9/2012 | Walker | |

OTHER PUBLICATIONS

Assaf, Maen Mahmoud Al, "Informed Prefetching in Distributed Multi-Level Storage Systems", A dissertation submitted to the Graduate Faculty of Auburn University in partial fulfillment of the requirements for the Degree of Doctor of Philosophy, Auburn, Alabama, Dec. 12, 2011, Copyright © 2011, Maen Mahmoud Al Assaf, pp. 1-156.

Jacobi et al., "Transactional Memory Architecture and Implementation for IBM System z", Proceedings 2012 IEEE/ ACM 45th International Symposium on Microarchitecture Micro-45, presented Dec. 1-5, 2012, pp. 25-36, Copyright © 2012 by The Institute of Electrical and Electronics Engineers, Inc.

Mak et al., "IBM System z10 Processor Cache Subsystem Microarchitecture", IBM J. Res. & Dev. vol. 53, No. 1, Paper 2, 2009, pp. 2:1-2:12.

McDonald, Austen, "Architectures for Transactional Memory", A Dissertation Submitted to the Department of Computer Science and the Committee on Graduate Studies of Stanford University in Partial Fulfillment of the Requirements for the Degree of Doctor of Philosophy, Jun. 2009, pp. 1-145.

Zhang et al., "PFC: Transparent Optimization of Existing Prefetching Strategies for Multi-level Storage Systems", The 28th International Conference on Distributed Computing Systems, 2008, ICDCS '08, pp. 740-751, DOI 10.1109/ICDC5.2008.89, © 2008 IEEE.

IBM, "Principles of Operation", SA22-7832-09; Tenth Edition, Sep. 2012, Copyright ©1990-2012, International Business Machines Corporation, 1,568 Pages.

Intel, "Intel® Architecture Instruction Set Extensions Programming Reference", 319433-012A, Feb. 2012, pp. 1-604.

Busaba et al., "Memory Access Request for a Memory Protocol", U.S. Appl. No. 14/867,148, filed Sep. 28, 2015, 30 pages.

Busaba et al., "Memory Access Request for a Memory Protocol", U.S. Appl. No. 15/160,074, filed May 20, 2016, 28 pages.

\* cited by examiner

MEMORY ACCESS REQUEST FOR A MEMORY PROTOCOL

BACKGROUND

The present invention relates generally to the field of computer memory, and more particularly to requests within a memory protocol.

Modern computer memory and memory access protocols may be implemented by a wide variety of technologies at varying levels of abstraction. For example, high level protocols may control access to virtual memory. In low level protocols, various memory controllers, caches, and the like may control processors' access to physical memory.

Hardware Transactional Memory (TM) provides a memory protocol for use in environments with multiple central processing units (CPUs), wherein a group of instructions, called a transaction, operate atomically and in isolation (sometimes called "serializability") on a data structure in memory. The transaction executes optimistically without obtaining a lock, but may need to abort and retry the transaction execution if an operation, of the executing transaction, on a memory location conflicts with another operation on the same memory location.

Generally, improvements to memory protocols for various environments, including virtual memory environments and hardware TM environments provide enhanced performance of the applicable computer system.

SUMMARY

A computer-implemented method includes identifying two or more memory locations and referencing, by a memory access request, the two or more memory locations. The memory access request is a single action pursuant to a memory protocol. The computer-implemented method further includes sending the memory access request from one or more processors to a node and fetching, by the node, data content from each of the two or more memory locations. The computer-implemented method further includes packaging, by the node, the data content from each of the two or more memory locations into a memory package, and returning the memory package from the node to the one or more processors. A corresponding computer program product and computer system are also disclosed.

DETAILED DESCRIPTION

Figure 1:
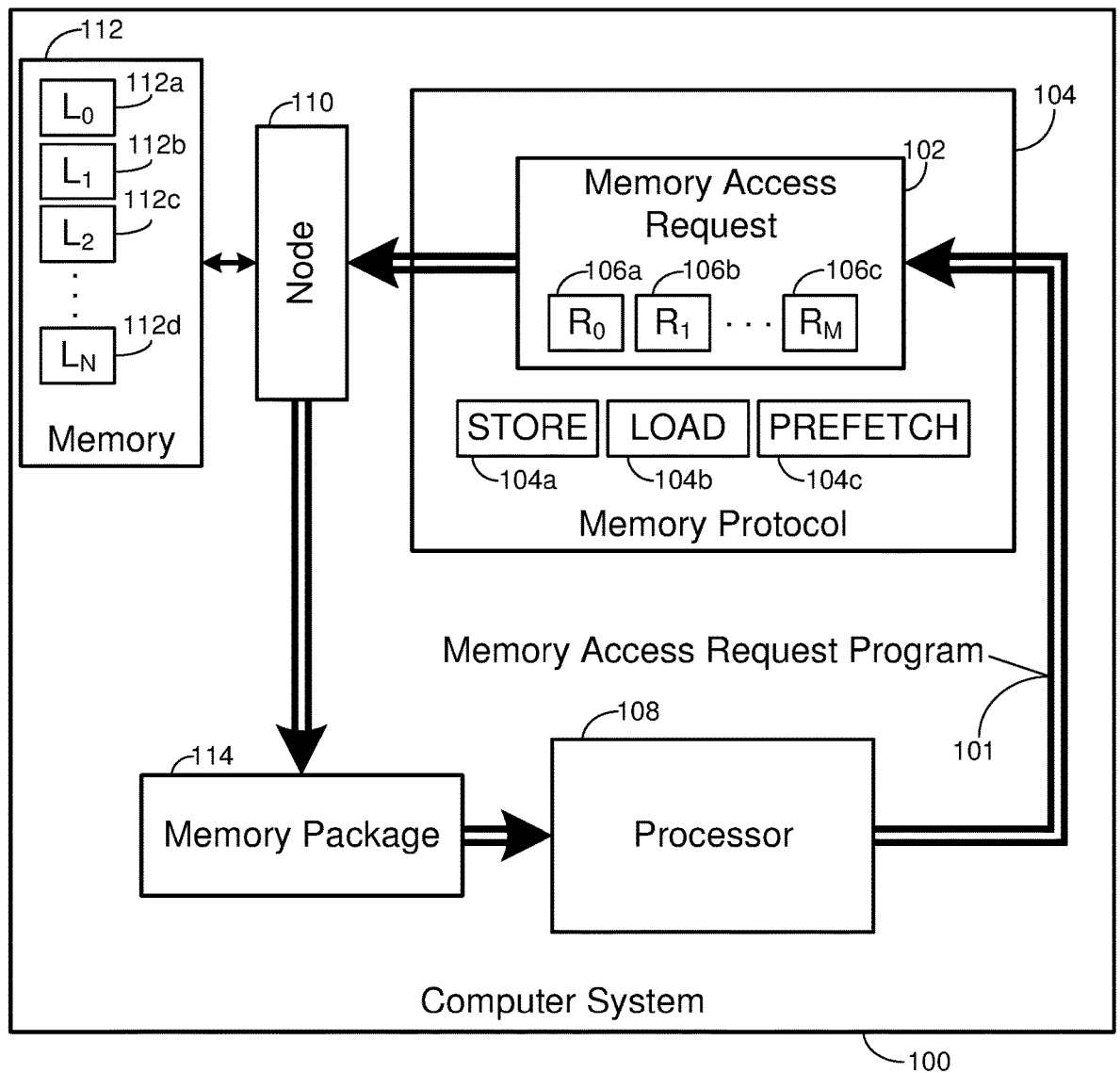
FIG. 1 is a block diagram depicting a computing environment suitable for operating a memory access request program, in accordance with one embodiment of the present invention.

Referring now to the invention in more detail, FIG. 1 is a block diagram depicting a computing environment, namely, a computer system 100, suitable for operating a memory access request program 101, i.e., a program performing memory access requests in accordance with one embodiment of the present invention. In the depicted embodiment, a processor 108 communicates with memory 112 (including the processor 108's cache or the cache of another processor) under a memory protocol 104. The memory protocol 104 is understood as providing all types of memory requests, including, for example, regular STORE 104a, LOAD, 104b, and PREFETCH 104c, as well as any others that may be implemented in the computer system 100. The Memory Access Request 102 may be understood as an atomic operation within the memory protocol, along similar lines to STORE 104a, LOAD 104b, etc.

The processor 108 may include one or more processors, and it may include both physical and virtual processors, including in a hardware Transactional Memory (TM) environment. The memory 112 may include both physical memory and virtual memory, as well as hardware TM. The memory protocol 104 may be implemented by a node 110. The node 110 may be any computing element that is configured for managing requests under the memory protocol 104; for example, the node may be of at least one type selected from the group consisting of: (a) one or more additional processors, (b) a memory controller, and (c) a cache controller.

Within the memory 112 are a plurality of memory locations, depicted as $L_0$ 112a, $L_1$ 112b, $L_2$ 112c, up to $L_N$ 112d, where N+1 is the size of the memory, in any units. As depicted in FIG. 1, the memory locations 112a-112d may reside in the system memory. In some embodiments, the memory locations may also include memory locations residing in the cache of another processor to which the node 110 may have access. According to various embodiments, the memory access request 102 is directed to two or more memory locations in a single action pursuant to the memory protocol 104. This property may fundamentally distinguish the memory access request 102 from a regular LOAD 104b. The memory access request 102 references two or more memory locations 112a-112d as reference locations $R_0$ 106a, $R_1$ 106b, up to $R_M$ 106c.

The two or more memory locations 112a-112d may or may not be contiguous in the memory 112, whether physical memory or logical memory space. Where the memory locations 112a-112d are not contiguous, they may nevertheless be nearby in physical memory. Accordingly, the memory access request program 101 may, when referencing the two or more memory locations 112a-112d, identify their numerical addresses. The memory access program 101 may identify, within the numerical addresses, shared high order bits, which result from the memory locations 112a-112d being proximate in the address space. The shared high order bits may then be the basis of compressing the memory locations 112a-112d, potentially allowing more locations to be referenced per instruction and achieving a performance enhancement.

In the memory access request program 101, the processor 108 sends the memory access request to the node 110, which fetches the data content for the reference locations 106a-106c in the memory 112 at the corresponding memory locations 112a-112d. The node packages the data content into the memory package 114. Broadly, the memory package may be understood as any transmission medium suitable for the particular implementation. In an embodiment, the memory package 114 may include all of the data grouped together as a single object. In another embodiment, the memory package may include transmitting each element of data content separately, optionally serially or in parallel.

Figure 2:
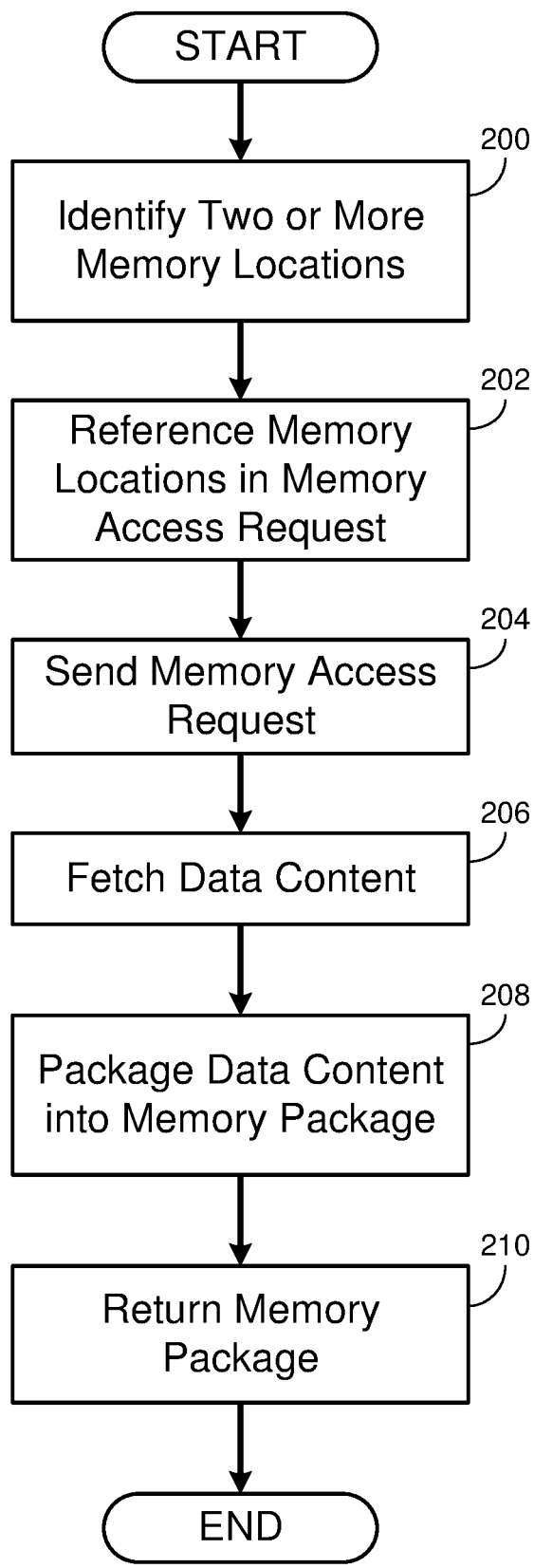
FIG. 2 is a flow chart diagram depicting a method for the memory access request program, in accordance with at least one embodiment of the invention.

Referring now to FIG. 2, FIG. 2 depicts a flow chart diagram for the memory access request program 101. At step 200, the memory access request program 101 identifies two or memory locations 112a-112d. As discussed above, the two or more memory locations 112a-112d may be addressed in physical or virtual memory. At step 202, the memory access request program 101 references, by a memory access request 102, the two or more memory locations 112a-112d. Referencing the two or more memory locations 112a-112d may be achieved by including, in the memory access request, reference locations 106a-106c. At step 204, the memory access request program sends the memory access request 102 from the processor 108 (which may be one or more processors) to the node 110. The memory access request 102 is pursuant to the memory protocol 104.

Referring still to the flowchart diagram of FIG. 2, the memory access request program 101 fetches, by the node 110, data content from each of the two or more memory locations 112a-112d. At step 208, the memory access request program 101 packages, by the node 110, the data content from each of the two or more memory locations 112a-112d into the memory package 114. At step 210, the memory access request program 101 returns the memory package 114 to the processor 108. As described above, the fetching, packaging, and returning of steps 206-210 may be accomplished in serial or in parallel, with parallel loading providing the most performance benefit. Similarly, the node 110 may utilize any of a variety of transmission techniques including loading the memory package 114 onto a bus, transferring the memory package to the processor 108's exclusive or shared cache, etc.

Figure 3:
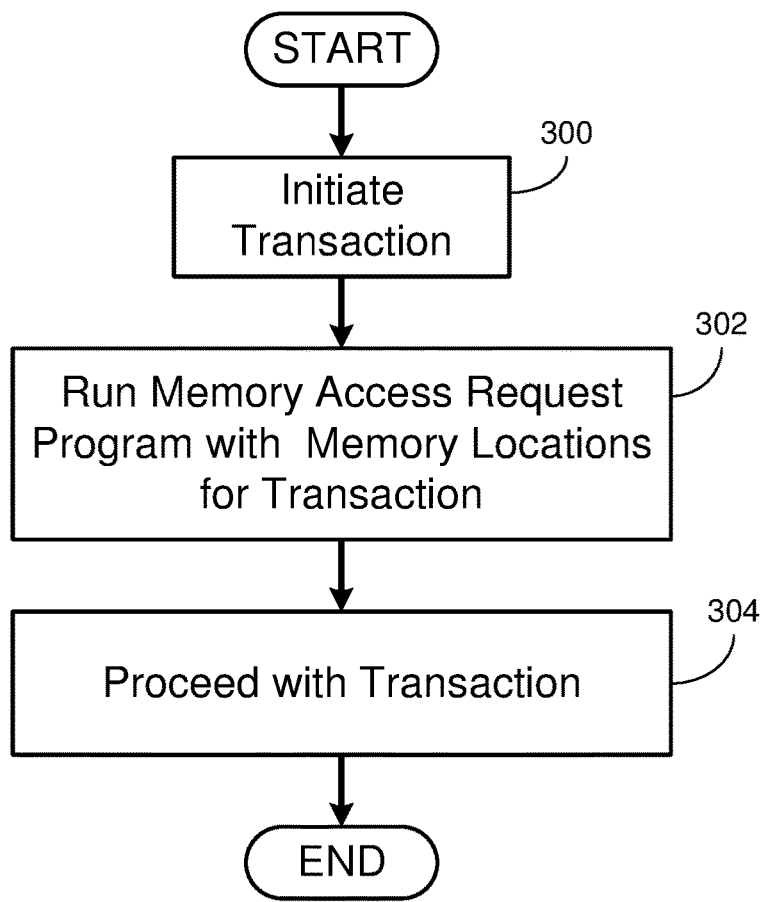
FIG. 3 is a flow chart diagram depicting the application of the memory access request program within a transactional memory environment, in accordance with at least one embodiment of the invention.

Referring now to the flowchart diagram of FIG. 3, FIG. 3 displays how the memory access request program 101 may be implemented in the context of a transactional memory environment such as hardware TM. At step 300, the processor 108 may initiate a transaction. At step 302, the memory access request program 101 may be run, for example at the beginning of the transaction, with some or all of the memory locations being for use in the transaction. Accessing the memory locations 112a-112d may be according to any TM coherency scheme, as described in more detail below, and using shared or exclusive resources as otherwise required for the particular transaction. At step 304, the processor 108 proceeds with the rest of the transaction.

Figure 4:
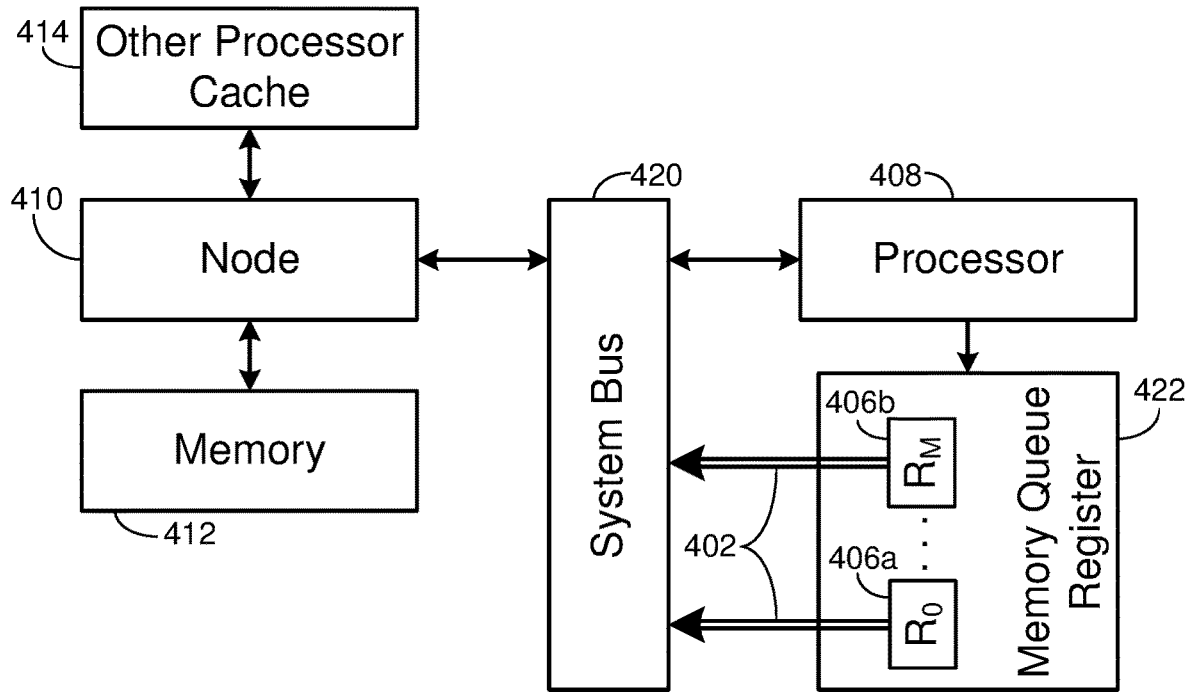
FIG. 4 is a block diagram depicting a memory queue register and various associated elements, in accordance with at least one embodiment of the invention.

Referring now to FIG. 4, FIG. 4 is a block diagram depicting an embodiment wherein the one or more processors 408 communicate with the node 410 via a system bus 420. In one embodiment, the one or more processors 408 are in electronic communication with at least one of a memory queue register 422 or an other processor cache 414, where by "other processor cache" is meant a cache for a processor (not shown in FIG. 4) other than processor 408. In the depicted embodiment, the memory access request program 101 achieves step 202, referencing, by a memory access request 102, the two or more memory locations 112a-112d, by storing the one or more corresponding reference locations $R_0$ 406a up to $R_M$ 406b in the memory queue register 422, and by placing each of the reference locations 406a-406b from the memory queue register 422 or the other processor cache 414 onto the system bus 420.

According to another embodiment, no memory queue registers are used for requests from another cache and are not using memory queue register 422. In such embodiments, the memory access request program 101 achieves step 202, referencing, by a memory access request 102, the two or more memory locations 112a-112d, by placing each of the reference locations 406a-406b onto the system bus 420. In one embodiment, placing each of the reference locations 406a-406b from the memory queue register 422 or the other processor cache 414 onto the system bus 420 is done in parallel in a single cycle of the one or more processors 408. This possible configuration may maximize the potential performance advantage of the memory access request program as compared to an ordinary LOAD. Alternatively, the memory access request program 101 may be rendered more flexible (able to accommodate more memory locations in a single instruction) and still performance-advantaged by placing the one or more memory locations 406a-406b onto the system bus 420 serially in consecutive cycles of the one or more processors 408. The embodiment depicted in FIG. 4, the Node 410 fetches, packages, and returns the data content from memory 412, or from another processor's cache 414, as otherwise described.

Figure 5:
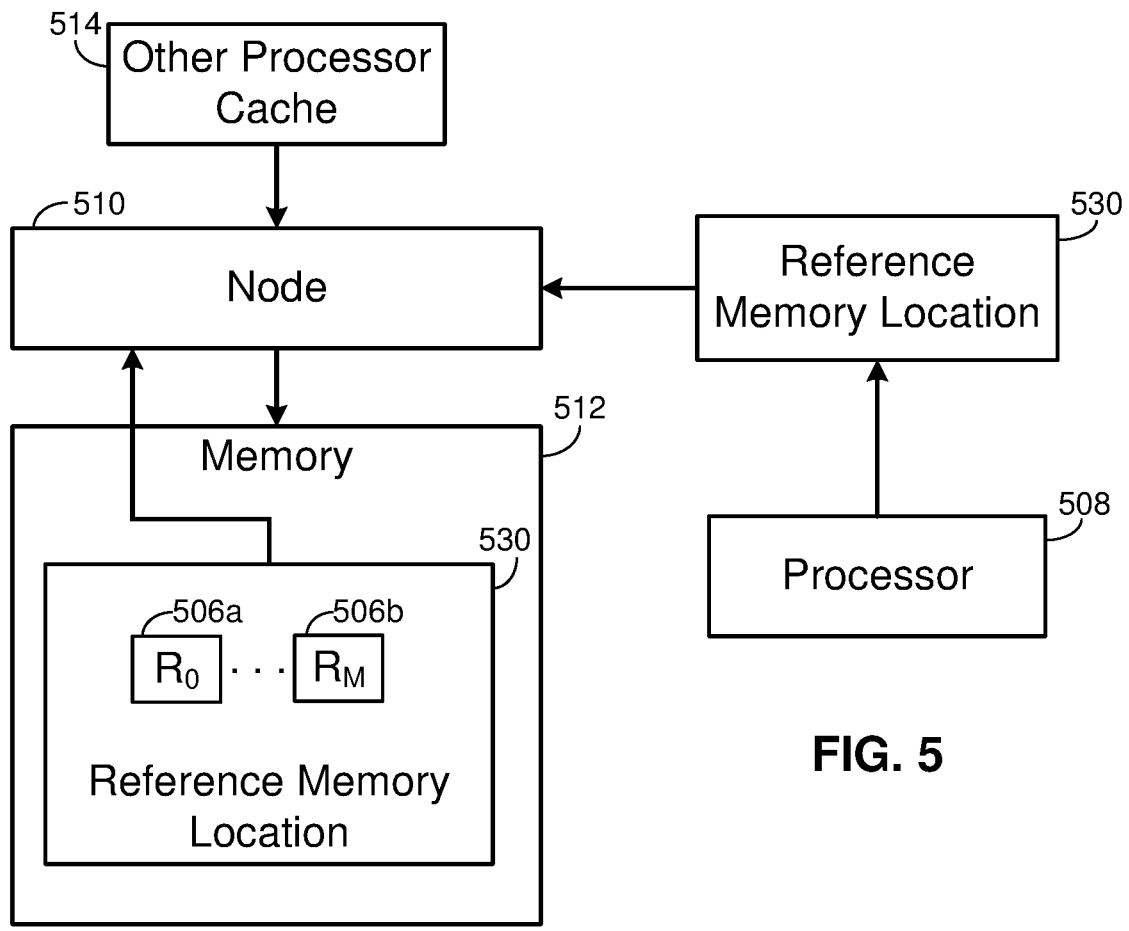
FIG. 5 is a block diagram depicting a reference memory location and various associated elements, in accordance with at least one embodiment of the invention.

Referring now to FIG. 5, FIG. 5 is a block diagram depicting an embodiment wherein memory access request program 101 identifies a reference memory location 530 and stores, by the processor 508, at the reference memory location 530, the two or more memory locations $R_0$ 506a up to $R_M$ 506b. In the depicted embodiment, the reference memory location 530 is itself a location in memory 530, which is necessarily accessible to the node 510. In the depicted embodiment, the node 530 fetches, packages, and returns data content from the memory 512 or an other processor cache 514 (i.e., a cache for a processor other than processor 508) as otherwise described.

Figure 6:
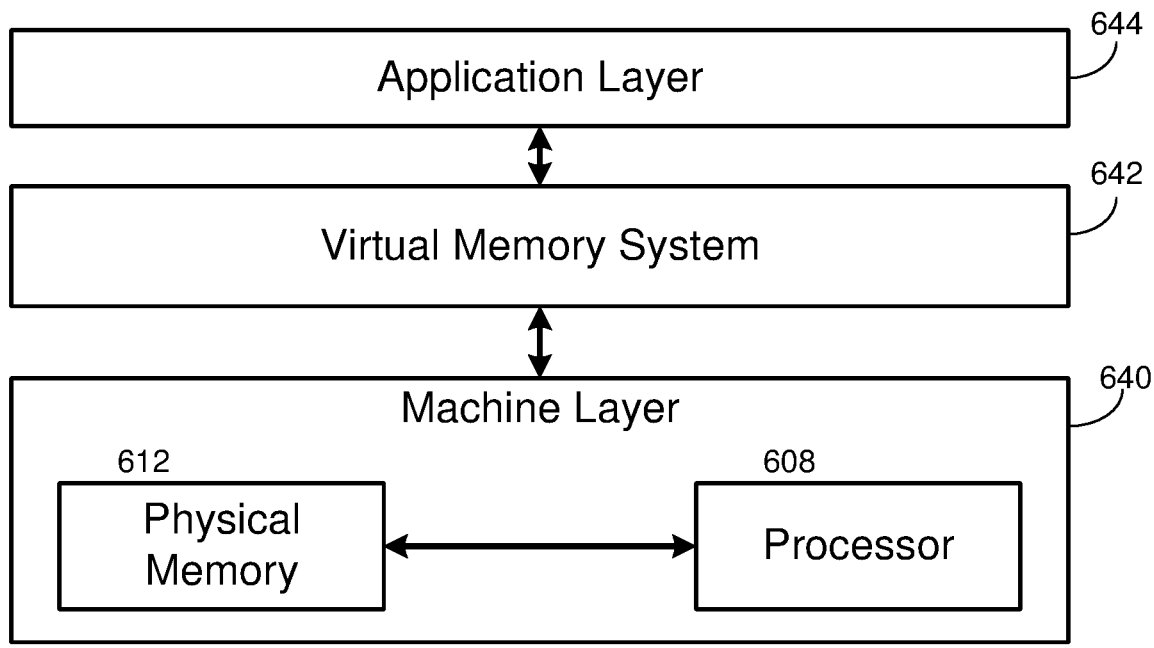
FIG. 6 is a block diagram depicting a virtual memory environment suitable for operation of the memory access request program, in accordance with at least one embodiment of the invention.

In some embodiments, the two or more memory locations 112a-112d are addressing physical memory directly. By contrast, the embodiment depicted in FIG. 6 displays one example of a computer system having a virtual memory system 642, which communicates with an application layer 644 and takes on the role of the node 110. In the depicted embodiment, the two or more memory locations may be addresses in virtual memory which the memory access request program 101 references by identifying an address space identifier, in addition to the protocol request and the addresses themselves. In the depicted embodiment, the node 110 fetches data content from the two or more memory locations by translating the virtual memory addresses to physical memory addresses, based on the address space identifier. In the depicted embodiment, the node 110 is configured for converting virtual memory address to physical addresses, reading and writing to a page file or swap storage, and other functions of virtual memory. This may be achieved by having the virtual memory system 642 communicate with the machine layer 640 via machine instructions to underlying processor 608, which in turn communicates with physical memory 612, according to translated addressing by the virtual memory system 642. In the depicted embodiment, the two or more memory locations 112a-112d, being virtual, are generated at the application layer 644.

In another embodiment the application layer 644 identifies physical, rather than virtual, memory addresses. Thus, the node 110 need not be configured for virtual memory address translation. This configuration may achieve a performance enhancement where the desired memory locations 112a-112d are known to be in a continuous block of physical memory, even though the memory locations 112a-112d need not, themselves, be continuous. If the block containing the memory locations 112a-112d is known to map to physically continuous regions of memory 112, then the application layer 644 may provide physical addresses across page boundaries, effecting a performance enhancement.

Figure 8:
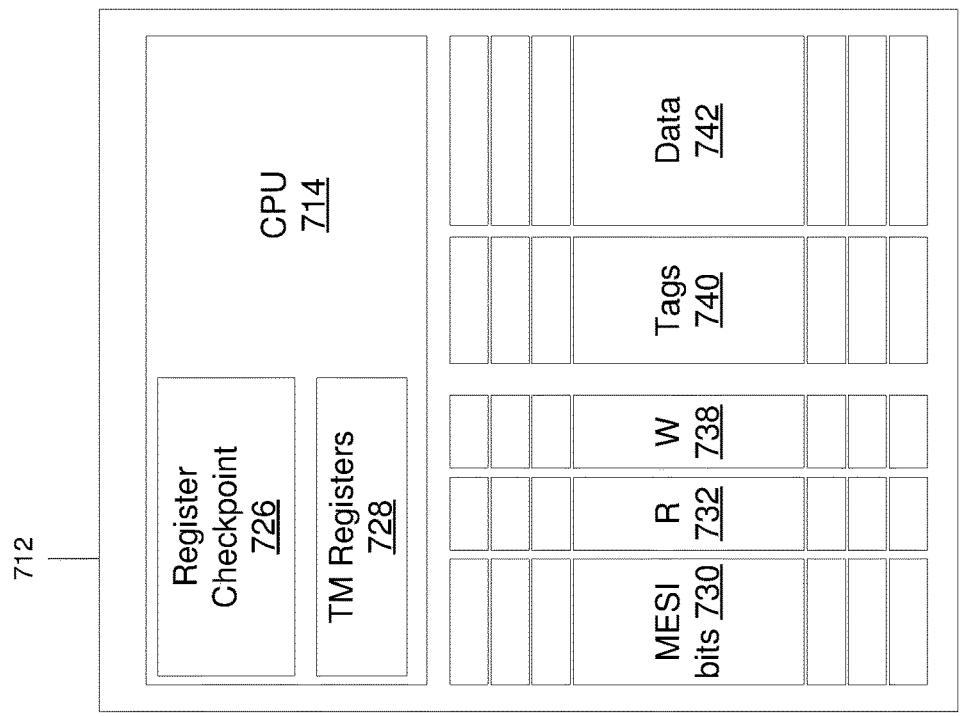
FIGS. 7 and 8 depict an example multicore transactional memory environment, in accordance with at least one embodiment of the present invention.
Figure 7:
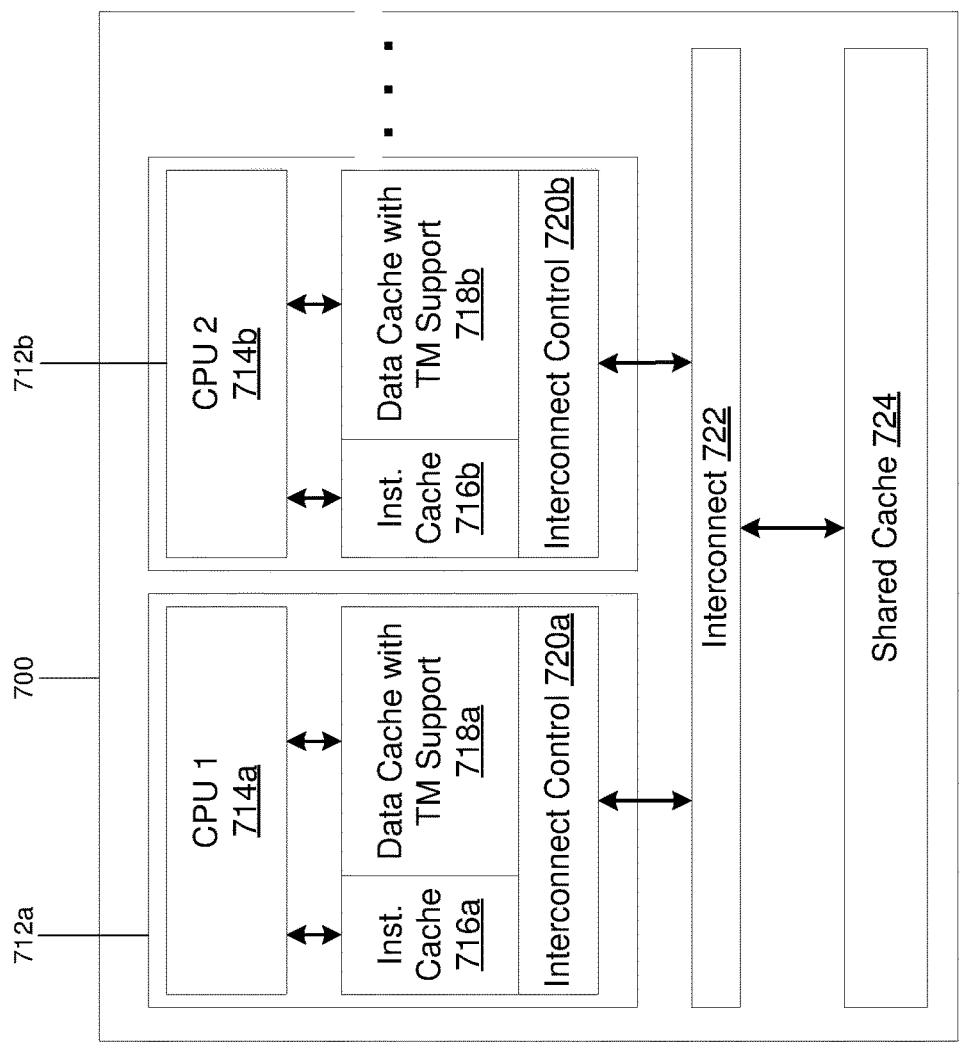

FIGS. 7 and 8 depict an example of a multicore TM environment. FIG. 8 shows many TM-enabled CPUs (CPU1 714a, CPU2 714b, etc.) on one die 700, connected with an interconnect 722, under management of an interconnect control 720a, 720b. Each CPU 714a, 714b (also known as a Processor) may have a split cache consisting of an Instruction Cache 716a, 716b for caching instructions from memory to be executed and a Data Cache 718a, 718b with TM support for caching data (operands) of memory locations to be operated on by the CPU 714a, 714b (in FIG. 7, each CPU 714a, 714b and its associated caches are referenced as 712a, 712b). In an implementation, caches of multiple dies 700 are interconnected to support cache coherency between the caches of the multiple dies 700. In an implementation, a single cache, rather than the split cache is employed holding both instructions and data. In implementations, the CPU caches are one level of caching in a hierarchical cache structure. For example each die 700 may employ a shared cache 724 to be shared amongst all the CPUs on the die 700. In another implementation, each die may have access to a shared cache 724, shared amongst all the processors of all the dies 700.

FIG. 8 shows the details of an example transactional CPU 714, including additions to support TM. The transactional CPU (processor) 714 may include hardware for supporting Register Checkpoints 726 and special TM Registers 728. The transactional CPU cache may have the Modified, Exclusive, Shared, or Invalid (MESI) bits 730, Tags 740 and Data 742 of a conventional cache but also, for example, R bits 732 showing a line has been read by the CPU 714 while executing a transaction and W bits 738 showing a line has been written-to by the CPU 714 while executing a transaction.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 732, W 738) may be provided for each cache line, in addition to, or encoded in the MESI coherency bits. An R 732 indicator indicates the current transaction has read from the data of the cache line, and a W 738 indicator indicates the current transaction has written to the data of the cache line.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

| | Example Transaction Code | | |
|---|---|---|---|
| | LHI | R0,0 | *initialize retry count=0 |
| loop | TBEGIN | | *begin transaction |
| | JNZ | abort | *go to abort code if CC1=0 |
| | LT | R1, lock | *load and test the fallback lock |
| | JNZ | lckbzy | *branch if lock busy |
| | . . . perform operation . . . | | |
| | TEND | | *end transaction |
| | . . . . . . | . . . . . . | |
| lckbzy | TABORT | | *abort if lock busy; this |
| | | | *resumes after TBEGIN |
| abort | JO | fallback | *no retry if CC=3 |
| | AHI | R0, 1 | *increment retry count |
| | CIJNL | R0,6, fallback | *give up after 6 attempts |
| | PPA | R0, TX | *random delay based on retry count |
| | . . . potentially wait for lock to become free . . . | | |
| | J | loop | *jump back to retry fallback |
| | OBTAIN | lock | *using Compare&Swap |
| | . . . perform operation . . . | | |
| | RELEASE | lock | |
| | . . . . . . | . . . . . . | |

Traditionally, IBM mainframe server processors contain a layer of firmware called millicode which performs complex functions like certain instruction executions, interruption handling, and system synchronization. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which General Registers (GRs) to restore.

The CPU 714 (FIG. 7) supports a special millicode-only instruction to read out the backup-GRs and copy them into the main GRs. The TBEGIN instruction address is also loaded from an SPR to set the new instruction address in the Program Status Word (PSW) to continue execution after the TBEGIN once the millicode abort sub-routine finishes. That PSW may later be saved as program-old PSW in case the abort is caused by a non-filtered program interruption.

The TABORT instruction may be millicode implemented; when the Instruction Decode Unit IDU decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR. The Perform Processor assist (PPA) instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114 (FIG. 1) to stop all conflicting work, retry the local transaction, before releasing the other CPUs 114 to continue normal processing. Multiple CPUs 114 must be coordinated to not cause deadlocks, so some serialization between millicode instances on different CPUs 114 is required.

Figure 9:
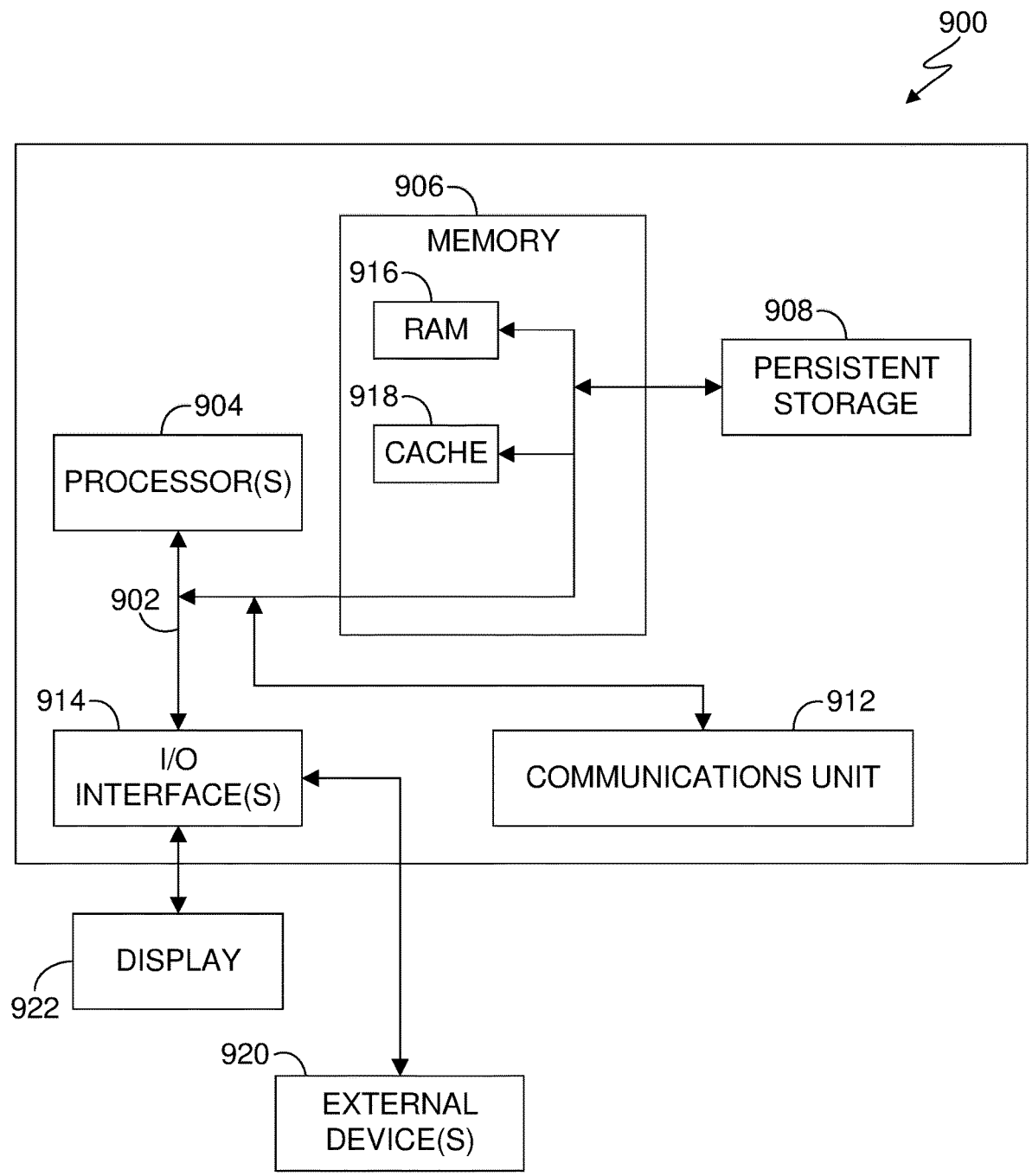
FIG. 9 is a block diagram of one example of a computing apparatus suitable for executing the memory access request program, in accordance with at least one embodiment of the invention.

FIG. 9 is a block diagram depicting components of a computer 900 suitable for executing the memory access request program 101. FIG. 9 displays the computer 900, the one or more processor(s) 904 (including one or more computer processors), the communications fabric 902, the memory 906, the RAM 916, the cache 918, the persistent storage 908, the communications unit 912, the I/O interfaces 914, the display 922, and the external devices 920. It should be appreciated that FIG. 9 provides only an illustration of one embodiment and does not imply any limitations with regard to the environments in which different embodiments may be implemented. Many modifications to the depicted environment may be made.

As depicted, the computer 900 operates over a communications fabric 902, which provides communications between the computer processor(s) 904, memory 906, persistent storage 908, communications unit 912, and input/output (I/O) interface(s) 914. The communications fabric 902 may be implemented with any architecture suitable for passing data or control information between the processors 904 (e.g. microprocessors, communications processors, and network processors), the memory 906, the external devices 920, and any other hardware components within a system. For example, the communications fabric 902 may be implemented with one or more buses.

The memory 906 and persistent storage 908 are computer readable storage media. In the depicted embodiment, the memory 906 comprises a random access memory (RAM) 916 and a cache 918. In general, the memory 906 may comprise any suitable volatile or non-volatile one or more computer readable storage media.

Program instructions for the hierarchical query program 101 may be stored in the persistent storage 908, or more generally, any computer readable storage media, for execution by one or more of the respective computer processors 904 via one or more memories of the memory 906. The persistent storage 908 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 506 may also be removable. For example, a removable hard drive may be used for persistent storage 908. Other examples include optical and magnetic disks, thumb drives, and smart cards that are inserted into a drive for transfer onto another computer readable storage medium that is also part of the persistent storage 908.

The communications unit 912, in these examples, provides for communications with other data processing systems or devices. In these examples, the communications unit 912 may comprise one or more network interface cards. The communications unit 912 may provide communications through the use of either or both physical and wireless communications links. In the context of some embodiments of the present invention, the source of the various input data may be physically remote to the computer 900 such that the input data may be received and the output similarly transmitted via the communications unit 912.

The I/O interface(s) 914 allow for input and output of data with other devices that may operate in conjunction with the computer 900. For example, the I/O interface 914 may provide a connection to the external devices 920, which may be as a keyboard, keypad, a touch screen, or other suitable input devices. External devices 920 may also include portable computer readable storage media, for example thumb drives, portable optical or magnetic disks, and memory cards. Software and data used to practice embodiments of the present invention may be stored on such portable computer readable storage media and may be loaded onto the persistent storage 908 via the I/O interface(s) 914. The I/O interface(s) 914 may similarly connect to a display 922. The display 922 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying two or more memory locations, wherein said two or more memory locations are virtual memory addresses generated at an application layer;
   initiating, by one or more processors, a transaction in a transactional memory environment, wherein said transaction includes a set of instructions that operate atomically and in isolation on a data structure in a memory, said transaction requiring data from each of said two or more memory locations;

generating, by said one or more processors, a memory access request as an atomic instruction in the transaction;

referencing, by said memory access request, said two or more memory locations, wherein referencing said two or more memory locations comprises identifying an address space identifier;

sending said memory access request from said one or more processors to a node, said memory access request comprising a single action pursuant to a memory protocol, wherein said node is configured for managing requests under said memory protocol, wherein said node is of at least one type selected from the group consisting of:
(a) one or more additional processors;
(b) a memory controller; and
(c) a cache controller;

fetching, by said node, data content from each of said two or more memory locations, wherein fetching said data content from each of said two or more memory locations comprises:
translating said virtual memory addresses to physical memory addresses, based on said address space identifier; and
retrieving said data content stored at each of said physical memory addresses;

packaging, by said node, said data content from each of said two or more memory locations into a memory package; and returning said memory package from said node to said one or more processors.

2. The computer-implemented method of claim 1, wherein the memory package is a single object that includes the data content from each of said two or more memory locations grouped together.

3. The computer-implemented method of claim 1, wherein the two or more memory locations are accessed according to a transactional memory coherency scheme using shared resources required for the transaction.

4. A computer-implemented method comprising:
identifying two or more memory locations, said two or more memory locations being virtual memory addresses generated at an application layer, each of said two or more memory locations being individually addressable;

initiating, by one or more processors, a transaction in a transactional memory environment, wherein said transaction includes a set of instructions that operate atomically and in isolation on a data structure in a memory, said transaction requiring data from each of said two or more memory locations;

generating a memory access request as an atomic instruction in the transaction, said memory access request referencing said two or more memory locations by identifying an address space identifier;

sending said memory access request from said one or more processors to a node, said memory access request comprising a single action pursuant to a memory protocol, wherein said node is configured for managing requests under said memory protocol, wherein said node is of at least one type selected from the group consisting of:
(a) one or more additional processors;
(b) a memory controller; and
(c) a cache controller;

fetching, by said node, data content from each of said two or more memory locations, wherein fetching the data content includes translating said virtual memory addresses to physical memory addresses, based on said address space identifier, and retrieving said data content from each of said physical memory addresses;

packaging, by said node, said data content from each of said two or more memory locations into a memory package; and returning said memory package from said node to said one or more processors.

5. A computer-implemented method comprising:
identifying two or more memory locations, wherein the two or more memory locations are virtual memory addresses generated at an application layer;

initiating, by a processor, a transaction in a transactional memory environment, wherein the transaction includes a set of instructions that operate atomically and in isolation on a data structure in a memory, the transaction requiring data from each of the two or more memory locations;

generating, by the processor, a memory access request as an atomic instruction in the transaction;

referencing, by the memory access request, the two or more memory locations, wherein referencing the two or more memory locations comprises identifying an address space identifier;

receiving, from the processor and by a node that is configured to manage memory requests according to a memory protocol, the memory access request for data stored at the two or more memory locations, the two or more memory locations being individually addressable memory locations, wherein the node is of at least one type selected from the group consisting of:
(a) one or more additional processors;
(b) a memory controller; and
(c) a cache controller;

fetching, by the node, data stored at each of the two or more memory locations, wherein fetching the data from each of the two or more memory locations comprises:
translating the virtual memory addresses to physical memory addresses, based on the address space identifier; and
retrieving the data stored at each of the physical memory addresses;

packaging, by the node, the retrieved data into a memory package that includes the data from all of the two or more memory locations; and transmitting, by the node, the memory package to the processor.

6. The computer-implemented method of claim 5, wherein the fetching, packaging, and transmitting operations are performed in parallel.

* * * * *